March 15, 1966   L. J. RAVER   3,241,031
DIODE PROTECTION
Filed June 14, 1962
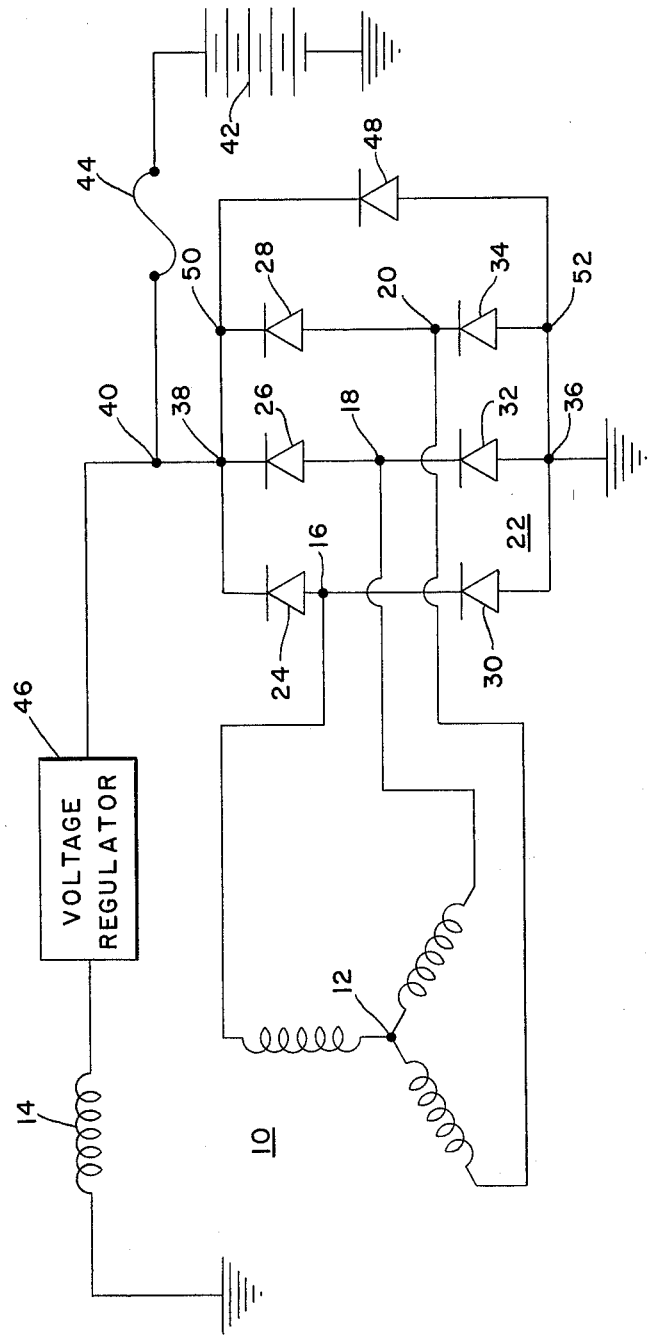
INVENTOR.
*Louis J. Raver*
BY
*C. R. Meland*
*His Attorney*

3,241,031
DIODE PROTECTION
Louis J. Raver, Anderson, Ind., assignor to General Motors Corporation, Detroit, Mich., a corporation of Delaware
Filed June 14, 1962, Ser. No. 202,564
8 Claims. (Cl. 320—59)

This invention relates to an electrical system for protecting diodes or rectifiers and more particularly to an electrical system for protecting a bridge rectifier network which supplies charging current to a battery or other load from a source of A.C. voltage.

In some electrical systems, such as motor vehicle electrical systems, a battery is charged from the D.C. output terminals of a bridge rectifier network which is fed from a source of A.C. voltage such as the output winding of an engine driven A.C. generator. In this type of system the diodes that make up the bridge rectifier frequently are of the PN junction semiconductor type and may be of the silicon type. These diodes have a low reverse current leakage and therefore can be used to rectify the A.C. output voltage of the generator as well as preventing the battery from discharging through the generator when the generator is idle.

One of the problems encountered with the use of silicon diodes in motor vehicle electrical systems is the inadvertent destruction of the diodes by connecting the battery in the wrong direction with the diodes or bridge rectifier network. Thus, the correct connection is such that the diodes prevent current flow from the battery through the generator. Should the battery be connected in a reverse manner, however, the diodes carry a very high forward current coming from the battery and the diodes act substantially as a short circuit for the battery. This wrong connection can be made when replacing the original battery with a new one or sometimes can be made when a slave or booster battery is used. The result of a wrong connection is that the silicon diodes carry such a high forward current that they frequently are permanently damaged.

It accordingly is an object of this invention to provide an electrical system that will prevent the destruction of the silicon diodes when a source of voltage is connected to the diodes or bridge rectifier in such a direction as to force current in a forward direction through the diodes.

A more specific objection of this invention is to provide an electrical system wherein an auxiliary diode having a higher current rating than the rectifying diodes is provided which by-passes the rectifying diodes.

Another object of this invention is to provide a protective circuit for a bridge rectifier network wherein an extra or auxiliary diode is connected across the D.C. output terminals of the bridge rectifier network and wherein this auxiliary or extra diode has a higher current rating than the individual rectifying diodes of the bridge rectifier network. With this arrangement the extra or auxiliary diode will carry the high amperage current should the D.C. terminals of the bridge rectifier network be connected with a D.C. power system in such a manner that the bridge rectifier diodes carry a forward current.

Further objects and advantages of the present invention will be apparent from the following description, reference being had to the accompanying drawing wherein a preferred embodiment of the present invention is clearly shown.

In the drawing:
The single figure drawings is a schematic circuit diagram of a diode protection circuit made in accordance with this invention.

Referring now to the drawing, the reference numeral 10 designates an alternating current generator having a three-phase Y-connected output winding 12 and a field winding 14. This generator may be of any well-known type and may be of a type wherein the field winding 14 is rotatable with respect to the output winding 12. In such an arrangement the output winding 12 is called the stator winding and an A.C. voltage is developed therein when the field winding 14 is supplied with current.

The phase windings of the output winding 12 are connected respectively with A.C. input terminals 16, 18 and 20 of a three-phase full-wave bridge rectifier network generally designated by reference numeral 22. This bridge rectifier network is comprised of six PN junction semiconductor diodes 24 through 34 which may be of the silicon type. These semiconductor diodes have a very low forward voltage drop when conducting current in a forward direction but have a low leakage reverse current characteristic. The bridge rectifier network 22 has a pair of D.C. output terminals 36 and 38, the output terminal 36 being grounded as shown.

The D.C. output terminal 38 is connected with a junction 40 and this junction is connected to one side of a battery 42 through a suitable circuit breaker which may take the form of a fuse 44. It is seen that the field winding 14 is supplied with field current from junction 40 through a suitable voltage regulator 46 which is shown in block diagram form and which may be of any suitable construction. It is seen from the foregoing that charging current is supplied to the battery 42 from junction 40 and through the fuse 44.

The system as thus far described is entirely conventional and the present invention is concerned with protecting the diodes 24 through 34 of the bridge rectifier 22 from destruction should the connection of the battery 42 be reversed from its connection shown in the drawing. To this end, an extra or auxiliary diode 48 is provided which like the diodes of the bridge rectifier network is a PN junction semi-conductor type and may be a silicon diode. It is seen that the diode 48 is connected with junctions 50 and 52 which in turn are connected with the D.C. output terminals of bridge rectifier 22 and with the lead wires that connect the respective sides of the diodes 24 through 34. The diode 48 should have a current rating which is by way of example and not by way of limitation five to seven times the current rating of a given diode that forms a part of the bridge rectifier network 22. By way of example and not by way of limitation, each diode that makes up a part of the bridge rectifier network 22 may have a forward current rating of 25 amperes and in such a system, the diode 48 will have a current rating of approximately 160 amperes.

In the operation of this system, it can be seen that under normal conditions the D.C. output terminals 36 and 38 will supply direct current to charge the battery 42 and to supply other D.C. loads on a motor vehicle which have not been illustrated.

The diode 48 protects the diodes 24 through 34 of the bridge rectifier 22 should the battery 42 be connected in such a manner that its positive side were grounded rather than its negative side as shown in the drawing. With such a wrong connection the diodes 24 through 34 that make up the bridge rectifier 22 and the diode 48 permit a high amperage current to flow between the terminals of the battery. If it were not for the diode 48, this current would have to pass through the diodes 24 through 34 that make up the bridge rectifier network 22 and as a consequence, these diodes would be destroyed. This destruction would occur even when a fused circuit is used since in many cases the diodes are destroyed before the fuse opens.

In order to better understand the function of diode 48 it should be pointed out that silicon diodes conduct little or no current in the forward direction until their threshold voltage is exceeded. These diodes then have a substantially constant voltage drop with increasing current and a lower current rated diode will of course fail before a higher current rated diode. The threshold voltage however remains about the same for the lower and higher current rated diodes.

In the system of this invention the threshold voltage of diode 48 will be about one half that of any pair of series connected diodes of the bridge rectifier since the threshold voltage of diode 48 is substantially equal to the threshold voltage of the individual diodes 24 through 34. If a wrong connection is made between the terminals of the bridge rectifier and the battery the diode 48 will conduct first because of its lower threshold voltage. The fuse 44 will now blow or in some instances the operator in observing an arc may remove the battery connection in time to save the fuse. The threshold voltage of the series connected diodes of the bridge rectifier is not attained before the fuse blows and these diodes therefore carry little or no current and are not damaged.

Although the diode 48 has been illustrated for use with a three-phase system, it will be appreciated that it could be used to protect single-phase rectifier systems and single-phase full wave bridge rectifier networks.

While the embodiment of the present invention as herein disclosed constitutes a preferred form, it is to be understood that other forms might be adopted.

What is claimed is as follows:

1. In combination, an alternating current generator having a three phase output winding, a three phase full-wave bridge rectifier network comprised of six PN junction semiconductor diodes having A.C. input terminals connected with said three phase output winding and having a pair of D.C. output terminals, said D.C. output terminals being adapted to be connected to a battery to supply charging current to said battery, and an auxiliary diode having a higher forward current rating than any of the diodes of said bridge rectifier network connected across said D.C. output terminals and poled to conduct current in the same direction as said bridge rectifier diodes, said auxiliary diode having a lower forward threshold voltage than the forward threshold voltage of two series connected diodes of said bridge rectifier network whereby said auxiliary diode conducts in a forward direction before conduction of said bridge rectifier diodes in a forward direction when a battery is connected with said D.C. output terminals in such a direction as to force current through said bridge rectifier diodes and said auxiliary diode in a forward direction.

2. In combination, a source of A.C. voltage, a bridge rectifier network comprised of a plurality of PN junction semiconductor diodes connected with said source of voltage having a pair of D.C. output terminals, said D.C. output terminals being adapted to be connected with the terminals of a battery to supply charging current to said battery, and an auxiliary diode of the PN junction semiconductor type having a higher forward current rating than any of the diodes forming said bridge rectifier network connected across the D.C. output terminals of said bridge rectifier network and poled to conduct current in the same direction as the diodes of said bridge rectifier network, said auxiliary diode having a lower forward threshold voltage than the forward threshold voltage of two series connected diodes of said bridge rectifier network whereby said auxiliary diode conducts first in a forward direction when a battery is connected with the D.C. output terminals of said bridge rectifier with such a polarity that it applies a forward bias to the diodes of said bridge rectifier network.

3. In a battery charging system, the combination comprising, a battery, a source of A.C. voltage, a bridge rectifier network comprised of a plurality of PN junction semiconductor diodes connected between said voltage source and said battery for supplying charging current to said battery, an auxiliary diode of the PN junction semiconductor type connected across the D.C. output terminals of said bridge rectifier network and poled to conduct current in the same direction as said bridge rectifier diodes, said auxiliary diode having a higher forward current rating than any of the diodes that form said bridge rectifier network and having a lower forward threshold voltage than the forward threshold voltage of two series connected diodes of said bridge rectifier network, said auxiliary diode conducting in a forward direction before the diodes of said bridge rectifier conduct in a forward direction when a battery is connected across said D.C. output terminals in a direction to force current through said diodes in a forward direction, and means responsive to a predetermined current flow through said auxiliary diode in a forward direction for disconnecting said battery from said D.C. output terminals.

4. In combination, a source of A.C. voltage, a battery, a rectifying circuit including at least one diode connected in circuit with said source of voltage and said battery for supplying charging current to said battery, an auxiliary diode having a higher forward current rating than said rectifying circuit connected in parallel with said rectifying circuit and battery and poled to conduct current in the same direction as said rectifying circuit, said auxiliary diode having a lower forward threshold voltage than the forward threshold voltage of said rectifying circuit whereby said auxiliary diode will conduct in a forward direction prior to the conduction of said rectifying circuit in a forward direction when a battery is connected to said rectifying circuit in such a direction as to force current in a forward direction through said rectifying circuit and auxiliary diode, and means responsive to a predetermined forward current flow through said auxiliary diode for disconnecting said rectifying circuit and battery.

5. In combination, a source of A.C. voltage, a bridge rectifier network comprised of a plurality of diodes having A.C. input terminals connected with said source of voltage and D.C. output terminals, said D.C. output terminals being adapted to be connected with the terminals of a battery to supply charging current to said battery, and an auxiliary diode connected across said D.C. output terminals and poled to conduct current in the same direction as the diodes of said bridge rectifier network, said auxiliary diode having a higher forward current rating than any of the diodes that form said bridge rectifier network, and circuit breaker means connected in series with one of said D.C. output terminals and said auxiliary diode, said auxiliary diode having a lower forward threshold voltage than the forward threshold voltage of two series connected diodes of said bridge rectifier network, said auxiliary diode conducting in a forward direction prior to the conduction of said diodes of said bridge rectifier network in a forward direction when a battery is connected to said D.C. output terminals in such a direction as to force current through said diodes in a forward direction whereby said circuit breaker means opens by current flowing through said auxiliary diode.

6. A rectifier circuit for charging a battery comprising, a bridge rectifier network comprised of a plurality of semiconductor diodes having D.C. output terminals which are adapted to be connected with a battery to be charged, and an auxiliary diode of the semiconductor type connected across said D.C. output terminals and poled to conduct in the same direction as said bridge rectifier network, said auxiliary diode having a higher forward current rating than any of the individual diodes that make up said bridge rectifier network and having a forward threshold voltage that is lower than the forward threshold voltage of two series connected diodes of said bridge rectifier network, said auxiliary diode conducting in a forward direction prior to the conduction of two of said series connected bridge rectifier diodes when a battery is connected with said D.C. output terminals in such a direction as to force current through said bridge rectifier diodes and said auxiliary diode in a forward direction.

7. In combination, a rectifying circuit for charging a battery including at least one diode adapted to be connected with a source of A.C. voltage for rectifying the A.C. voltage to direct current that is supplied to a battery, an auxiliary diode having a higher forward current rating than said rectifying circuit connected in parallel with said rectifying circuit and poled to conduct current in the same direction as said rectifying circuit, said auxiliary diode having a lower forward threshold voltage than the forward threshold voltage of said rectifying circuit, said auxiliary diode conducting current in a forward direction prior to the conduction of current through said rectifying circuit in a forward direction when a battery is connected with said rectifying circuit in such a direction as to force current in a forward direction through said rectifying circuit and auxiliary diode, and circuit breaker means connected in series with said auxiliary diode and rectifying circuit and opening when current of a predetermined magnitude is forced in a forward direction through said auxiliary diode.

8. The combination according to claim 7 where the rectifying circuit and the auxiliary diode are both comprised of PN junction semiconductor diodes.

References Cited by the Examiner

UNITED STATES PATENTS

| 2,908,854 | 10/1959 | Rice | 320—61 X |
| 2,969,494 | 1/1961 | Davis | 321—11 |
| 3,124,738 | 3/1964 | Smith et al. | 321—14 |

FOREIGN PATENTS

| 956,145 | 1/1957 | Germany. |
| 775,620 | 5/1957 | Great Britain. |

LLOYD McCOLLUM, *Primary Examiner.*